(12) United States Patent
Jansen (10) Patent No.: US 6,272,924 B1
(45) Date of Patent: *Aug. 14, 2001

(54) APPARATUS AND METHODS FOR A HUMAN EXTENDER

(75) Inventor: John F. Jansen, Knoxville, TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,436

(22) Filed: Feb. 19, 1999

(51) Int. Cl.$^7$ .............................. A61B 5/22; A63B 21/00; G01L 3/24

(52) U.S. Cl. ........................................ 73/379.01; 318/566

(58) Field of Search ............................ 73/862.043, 866.4, 73/379.01, 379.02, 865.8, 1 D, 862.541; 254/270; 345/156; 244/223

(56) References Cited

U.S. PATENT DOCUMENTS

| | | | | |
|---|---|---|---|---|
| 5,125,270 | * | 6/1992 | Kovacevic | 73/379.02 |
| 5,429,009 | * | 7/1995 | Wolfe et al. | 73/865.8 |
| 5,551,308 | * | 9/1996 | Arai et al. | 73/862.541 |
| 5,865,426 | | 2/1999 | Kazerooni | 254/270 |
| 6,026,684 | * | 2/2000 | Calder | 73/379.02 |

OTHER PUBLICATIONS

Kazerooni, "A New Dimension in Material Handling" (1998).

Kazerooni, "The Extender Technology at the University of California, Berkeley," J. Sice vol. 34, No. 4, pp. 291–298 (Apr., 1995).

Kazerooni, "Human Enhancement via the Transfer of Power and Information Signals" (1994).

Kazerooni and Guo, "Human Extenders," ASME J. Dynamic Systems, Measurements and Control, 115–2(B) (Jun., 1993).

Kazerooni and Her, "A Virtual Exercise Machine," IEEE, pp. 232–238 (1993).

Kazerooni, "Issues on the Control of Robotic Systems Worn By Humans," pp. 386–388 (1992).

Kazerooni and Mahoney, "Dynamics and Control of Robotic Systems Worn By Humans," ASME J. Dynamic Systems, Measurements and Control, 113–, pp. 379–387 (Sep., 1991).

Kazerooni, "Human–Robot Interaction via the Transfer of Power and Information Signals," IEEE Transactions on Systems and Cybernetics, 20–2 (Mar., 1990).

Kazerooni and Foslien, "On the Control and Stability of Robots Worn by Human: Theory," American Control Conference, pp. 1918–1924 (Jun., 1989).

Kazerooni and Hessburg, "On the Control and Stability of Robots Worn by Human: Experiments," American Control Conference, pp. 1925–1930 (Jun., 1989).

(List continued on next page.)

Primary Examiner—Benjamin R. Fuller
Assistant Examiner—Octavia Davis
(74) Attorney, Agent, or Firm—Needle & Rosenberg, P.C.

(57) ABSTRACT

A human extender controller for interface between a human operator and a physical object through a physical plant. The human extender controller uses an inner-feedback loop to increase the equivalent damping of the operating system to stabilize the system when it contacts with the environment and reduces the impact of the environment variation by utilizing a high feedback gain, determined by a root locus sketch. Because the stability of the human extender controller of the present invention is greatly enhanced over that of the prior art, the present invention is able to achieve a force reflection ratio 500 to 1 and capable of handling loads above the two (2) ton range.

27 Claims, 8 Drawing Sheets

OTHER PUBLICATIONS

Kazerooni, "Human/Robot Interaction via the Transfer of Power and Information Signals Part I: Dynamics and Control Analysis," IEEE, pp. 1632–1640 (1989).

Kazerooni, "Human/Robot Interaction via the Transfer of Power and Information Signals Part II: An Experimental Analysis," IEEE, pp. 1641–1647 (1989).

ERGOLIFT Promotinal Material.

BALAMAN Promotional Material.

GE Company, "Final Report on Hardiman I Prototype for Machine Augmentation of Human Strength and Endurance," Schenectady, New York (1971).

GE Company, "Hardiman I Prototype Project: Special Interim Study," Report s–68–1060, Schenectady, New York (1968).

* cited by examiner

APPARATUS AND METHODS FOR A HUMAN EXTENDER

This invention was made with Government support under a contract awarded by the U.S. Department of Energy, and the Government has certain rights in this invention.

BACKGROUND OF THE INVENTION

1. Field of the Invention

The present invention comprises an apparatus and methods for a human extender. In particular, the invention relates to an apparatus and methods for a human extender controller capable of interfacing a human operator and a physical object so that the physical object can be dexterously manipulated.

2. Background Art

A human extender is a device that amplifies the lifting capacity of a human operator and allows a preselected amount of force feedback to the operator (i.e., the operator can feel part of the load). This type of system is fundamentally different from a teleoperator system because the master and slave manipulators are a single unit in a human extender. This concept was first developed in the 1960's by General Electric during the Hardiman project, as documented in the publications of "Special Interim Study, Hardiman I Prototype Project," Report S-68-1060, General Electric Company, Schenectady, N.Y., Apr. 19, 1968, "Hardiman I Arm Test, Hardiman I Prototype Project," Report S-70-1019, General Electric Company, Schenectady, N.Y., Dec. 31, 1969, and "Final Report on Hardiman I Prototype for Machine Augmentation of Human Strength and Endurance," General Electric Company, Schenectady, N.Y., Aug. 30, 1971. More recently, Kazerooni disclosed a scaled down version of a similar concept in the papers of "Human/Robot Interaction via the Transfer of Power and Information, Part I: Dynamics and Control Analysis," Kazerooni, H., EKE Robotic and Automation Conference, pp. 1632–1640 (Scottsdale, Ariz., 1989), "Human/Robot Interaction via the Transfer of Power and Information, Part 2: An Experimental Analysis," Kazerooni, H., EKE Robotic and Automation Conference, pp. 1641–1647 (Scottsdale, Ariz., 1989), "Human-Robot Interaction via the Transfer of Power and Information Signal," Kazerooni, H., EKE Transaction on Systems, Man, and Cybernetics, Vol. 20, No. 2, pp. 450–463 (1990), and "Human Extenders," Kazerooni, H., J. Guo, Journal of Dynamic Systems, Measurement, and Control, Vol. 115, pp. 281–290 (1990).

The human extender concept is developed in order to take benefit from the strength advantage of robot manipulators and the intellectual advantage of human beings. Numerous human activities require human operators performing tasks that demand their intelligence and physical strength often beyond their capability. These tasks cannot be best performed by a traditional robot manipulator because these tasks need a spontaneous information signal and power transfer between the human operator and the working environment, which cannot be provided by the traditional robot manipulator with a master-slave design. In contrast, force reflection occurs naturally in a human extender. Without a separate set of actuators, the human hand feels the actual forces on the extender, both direction of motion and a scaled-down version of the load. For example, if a human extender manipulates a 500 lbs. object, the human operator may just feel 10 lbs. while the extender supports the rest of the load. This 10 lbs. contact forces are used not only for manipulation of the object, but also for generating the appropriate signals to the extender controller. The capability of a human extender is often measured by its force reflection ratio, which is defined as the ratio of the real load to the forces the human feels. For the example just given, the force reflection ratio is 50 to 1.

Many potential uses are available for human extender. For example, in an unstructured environment, military personnel often need to use special equipment such as weapon loader to manipulate and orient large objects. An equipment capable of transmitting back to the operator a fraction of the object's dynamics (e.g., its weight, contact forces, inertia, slippage, etc.) could significantly enhance productivity, quality, and safety. A human extender can be integrated into a weapon loader to perform such tasks.

Similarly, a human extender can find a wide area of civic use in fields such as the package-delivery service industry. Package-delivery companies, such as United Parcel Service of America, Inc. (UPS), have increased their weight limit on the boxes they carry gradually. UPS has gone from 70 pounds to 150 pounds in order to remain competitive. UPS has also experience a 2 to 3% higher lost time due to injuries than similar types of businesses. A typical job at a UPS hub requires lifting and sorting up to 900 boxes an hour and placing them on a dozen conveyor belts. A dextrous device that has a large work space and can handle large payloads, while utilizing the intelligence of the operator to spontaneously generate the command signal to handle the loads repeatedly, safely, accurately and efficiently, could have a significant impact in the package-delivery service industry. Similar devices can find their use in manufacture assembly lines, in rescue operations, in construction industry and many other areas.

However, a number of problems associated with the available human amplifier systems. Profound instabilities due to gross nonlinearities in the fluid power system (e.g., nonlinear pressure-flow relationship, time varying fluid properties, large quantities of nonlinear friction, time varying system dynamics) and differences in human operator dynamics rendered the system impractical for large force gains as discussed in the paper of "Human-Robot Interaction via the Transfer of Power and Information Signal," Kazerooni, H., EKE Transaction on Systems, Man, and Cybernetics, Vol. 20, No. 2, pp. 450–463 (1990). These instabilities occur when the human extender makes contact with the environment. To overcome these instabilities, a computed torque technique was used with a proportional plus derivative law ("PD") controller as the primary stabilizing controller as disclosed in the paper of "Human Extenders," Kazerooni, H., J. Guo, Journal of Dynamic Systems, Measurement, and Control, Vol. 115, pp. 281–290 (1990). Unfortunately, computed torque technique is a model based scheme that requires significant knowledge about the physical system plus it represents a significant computational burden on the controller. Computed torque can be rendered basically useless if the model is just a few percent off of the calculated value. Because of these problems, the current human extenders have very limited payload capacities and limited force reflection ratios under 19 to 1 as discussed in the paper "Human Extenders," Kazerooni, H., J. Guo, Journal of Dynamic Systems, Measurement, and Control, Vol. 115, pp. 281–290 (1990).

A one-axis human amplifier system is described in U.S. Pat. No. 5,865,426 issued to Kazerooni. Upward vertical forces such as gravity and inertia are reduced to the human operator through this system when picking up a load such as a heavy box. The load is attached to a single actuator through a wire rope. Since wire rope can react only to tension type loads this system is suitable for lifting objects only in the upward vertical direction. This system is deficient for tasks that require forces in both the upward and downward directions or if forces and moments are required in other planes of motion.

Moreover, recent development in military loading and reloading devices invites the improvement of human extenders. Present reloading devices consist of a family of mobile heavy hydraulic lifters called the Jammer. Although very well designed, the Jammer systems require a three-person crew and for certain loading conditions the turn-around time can sometimes rise dramatically. To reduce the crew size by one and to reduce the overall reloading times, the USAF Air Combat Command is investigating improved weapons loading equipment and techniques. A seven degree-of-freedom system on top of an omni-directional platform has been recently built for the Air Force as part of the Next Generation Munitions Handler Initiative (NGMH). The NGMH is a hydraulically powered manipulator and vehicle intended for dexterously manipulation of missiles and bombs or other materials (e.g., fuel tanks) on various aircraft in the Air Force arsenal. The NGMH has been built to move objects weighing from 200 lbs. to 2000 lbs. while having a position resolution of less than 1 mm. Furthermore, the NGMH has incorporated the human extender concept into its operating system. As a result, the NGMH can amplify the lifting capacity of a person and allow a preselected amount of force feedback to the operator (i.e., the operator can feel part of the reaction load plus his/her forces are amplified to the object). A wide range of force reflection ratios (1 to over 500) with sub millimeter positioning accuracies have been achieved. This development, combined with the instability problem associated with the current available human extender system, has prompted further investigation of new approaches to insure stability when the human extender makes contact with the environment and to design a human extender controller in such a manner that it would be robust to fairly large model uncertainty with modest computational requirements.

SUMMARY OF THE INVENTION

Definitions

A number of abbreviations used in this application for some frequently used technical terms are defined as the following:

The term "$D_{act}$" as used herein shall refer to drive signal to servo drive cards.

The term "$F_{act}$" as used herein shall refer to actuator forces or moments vector.

The term "$F_{hand}$" as used herein shall refer to hand forces and moments vector.

The term "$F_{env}$" as used herein shall refer to environment reaction forces and moments vector.

The term "$\theta_{jnt}$" as used herein shall refer to angular position vector of joint angles or joint displacements.

$F_{act}$, $F_{hand}$ and $F_{env}$ are typically 6×1 vectors. The term "force(s)" as used herein shall refer to force(s) or moment(s) or combination of force(s) and moment(s).

Summary

The present invention overcomes the disadvantages of the prior art and discloses a new design of apparatus and methods for a human extender. The human extender includes a human extender controller and a human extender physical plant. The human extender controller interfaces between a human operator and the human extender physical plant. Specifically, the human extender controller according to the present invention increases the equivalent damping of the operating system to stabilize the system by utilizing at least one inner-feedback loop when it contacts with the environment and reduces the impact of the environment variation by utilizing a high gain feedback. Because the stability of the human extender controller of the present invention is greatly enhanced over that of the prior art, the present invention is able to achieve force reflection ratios ranging from 1:1 to 500:1 and is capable of handling loads safely above the two (2) ton range. Moreover, the capacity of the human extender of the present invention can be further increased by incorporating more powerful actuators.

According to one preferred embodiment of the present invention, a controller for interfacing a human operator and a physical object through a physical plant, wherein the physical plant is driven by at least one actuator, has means for generating incoming signals, wherein the incoming signals include contact force signals representative of forces from the hand of the human operator interacting with the surrounding environment, interacting force signals representative of forces caused at the physical plant by the interaction between the physical plant and the physical object, and actuating force signals representative of forces caused at the actuator by the interaction between the physical plant and the physical object. The controller also has means for compensating at least partially the incoming signals directly in response to variations of the environment, and means for generating drive signals from the at least partially compensated signals, so that the actuator uses the drive signals to manipulate the physical object through the physical plant.

The controller for interfacing a human operator and a physical object through a physical plant, wherein the physical plant is driven by actuating means, in another preferred embodiment, has means for generating contact force signals representative of forces from the hand of the human operator interacting with the surrounding environment, means for generating interacting force signals representative of forces caused at the physical plant by the interaction between the physical plant and the physical object, means for generating actuating force signals representative of forces caused at the actuating means by the interaction between the physical plant and the physical object, means for collecting and filtering the contact and interacting force signals, means for compensating the contact and interacting force signals, means for compensating the actuating force signals, and means for generating drive signals from the contact force signals, interacting force signals and actuating force signals, so that the actuating means uses the drive signals to manipulate the physical object through the physical plant.

A controller for interfacing a human operator and a physical object through a physical plant, wherein the physical plant is driven by at least one actuator, according to yet another preferred embodiment of the present invention, includes at least one first force sensitive device for generating contact force signals representative of forces from the hand of the human operator interacting with the surrounding environment, at least one second force sensitive device for generating interacting force signals representative of forces caused at the physical plant by the interaction between the physical plant and the physical object, and at least one third force sensitive device for generating actuating force signals representative of forces caused at the actuator by the interaction between the physical plant and the physical object. The controller also has at least one first filter receiving the contact force signals from the first force sensitive device, at least one second filter receiving the interacting force signals from the second force sensitive device, and a compensator for compensating the contact and interacting force signals, wherein the compensator is capable of producing high feedback gain. The controller further has an inner-feedback loop having a constant gain for compensating the actuating force signals, where the inner-feedback loop includes a load cell. The controller additionally has a limiter receiving the compensated contact force signals, interacting force signals and actuating force signals, and thereby generating drive signals for manipulating the physical object, so that the actuator receives the drive signals and uses the drive signals to manipulate the physical object through the physical plant.

According to still another embodiment, the present invention provides a method for interfacing a human operator and a physical object through a physical plant, wherein the physical plant is driven by at least one actuator, by generating contact force signals representative of forces from the hand of the human operator interacting with the surrounding environment, generating interacting force signals representative of forces caused at the physical plant by the interaction between the physical plant and the physical object, generating actuating force signals representative of forces caused at the actuator by the interaction between the physical plant and the physical object, receiving and filtering the contact force signals and interacting force signals, compensating the actuating force signals, generating drive signals from the contact force signals, interacting force signals and actuating force signals, and using the drive signals to manipulate the physical object through the physical plant. Practicing the present invention according to this method also includes the steps of changing the contact force signals and interacting force signals into equivalent Cartesian velocity signals, converting the Cartesian velocity signals into joint velocity signals by inverting a manipulator-specific Jacobian matrix, and compensating the joint velocity signals with high gain feedback. Additionally, practicing the present invention needs solving a characteristic equation of transfer function to determine the gain to reduce overshooting to a step response.

The present invention can also be practiced by generating incoming signals, wherein the incoming signals include contact force signals representative of forces from the hand of the human operator interacting with the surrounding environment, interacting force signals representative of forces caused at the physical plant by the interaction between the physical plant and the physical object, and actuating force signals representative of forces caused at the actuator by the interaction between the physical plant and the physical object, compensating at least partially the incoming signals directly in response to variations of the environment, generating drive signals from the at least partially compensated incoming signals, and using the drive signals to manipulate the physical object.

Other advantages and uses for the present invention will be more clearly understood by reference to the remainder of this document.

BRIEF DESCRIPTION OF THE DRAWINGS

FIGS. 1A–1C display a Next Generation Munition Handler (NGMH) system currently built for the military according to a preferred form of the present invention: (A) a perspective view of the NGMH system; (B) a photo of the NGMH system in use; and (C) same as (B) but from a different view angle.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the FIGS. 1–7, in which like numbers indicate like parts throughout the FIGS. 1–7.

Referring generally to FIGS. 1–7, the present invention comprises a human extender controller that offers a stable and less computational intensive interface between a human operator and a human extender physical plant. According to the field test data obtained through using the NGMH, which has a mechanical manipulator based on an embodiment of the present invention, the present invention provides a substantially stable human extender with force reflection ratios ranging from 1:1 to 500:1 and capable of handling loads safely above the two (2) ton range.

Figure 1C:
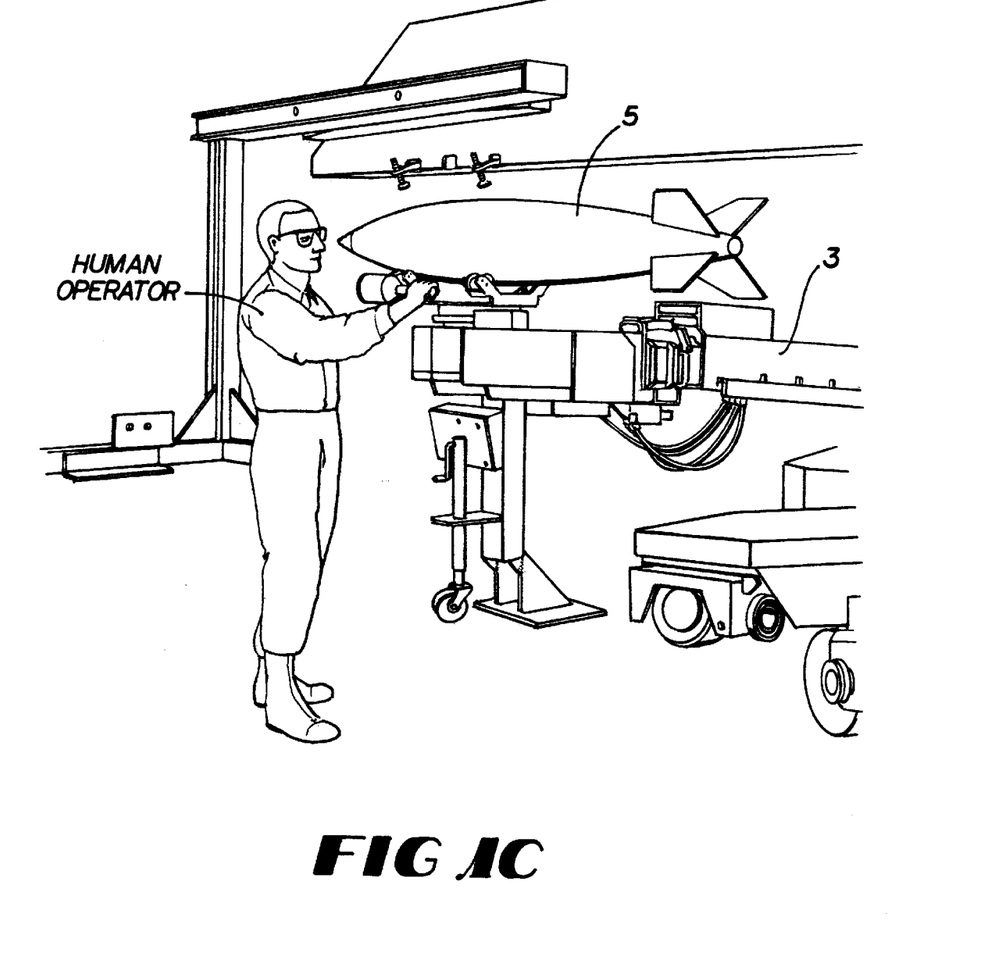
Figure 2:
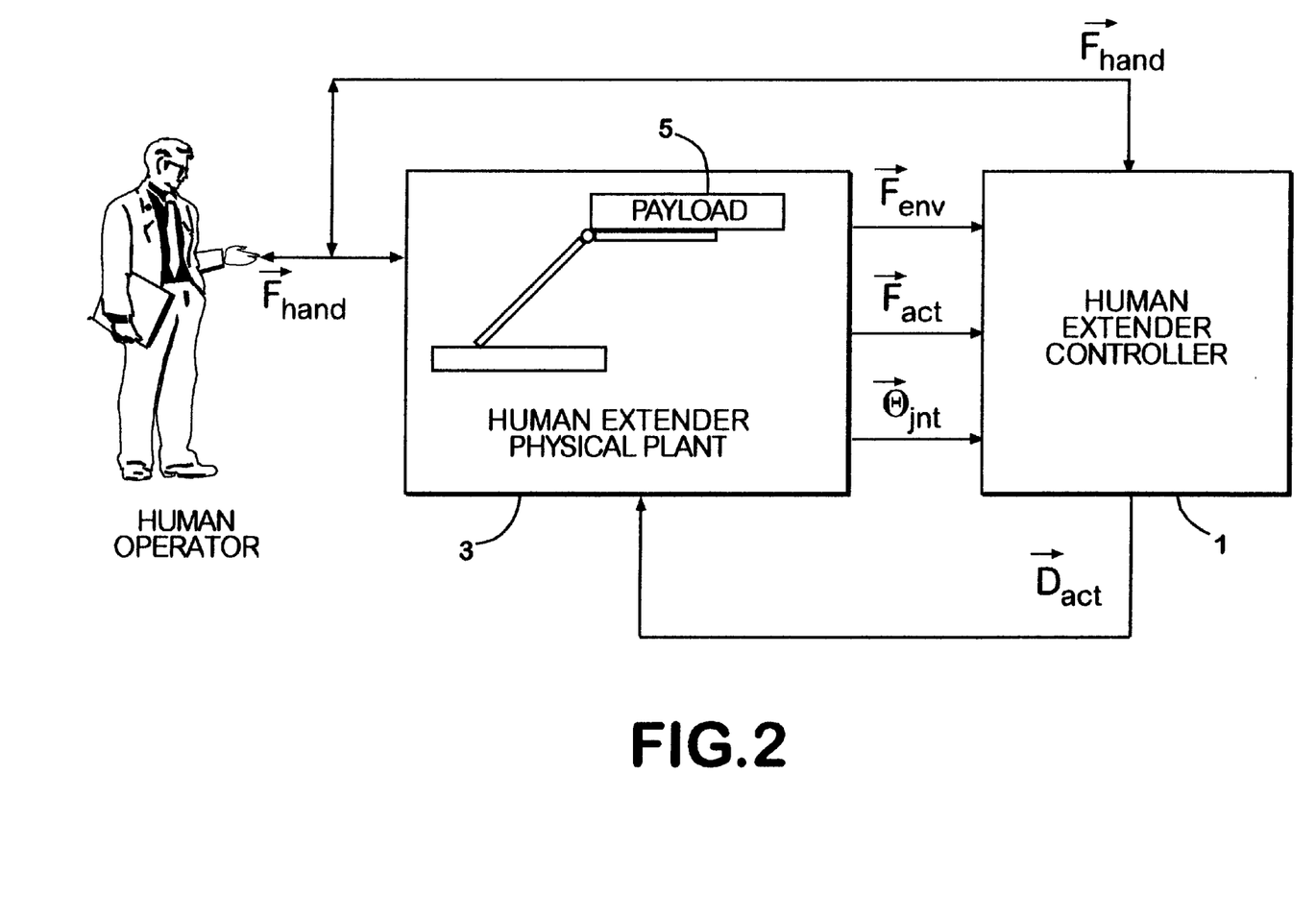
FIG. 2 is a high level functional diagram showing the exchange of information between the human extender controller, the human extender physical plant, and the human operator.

Referring to FIG. 2, human extender controller 1 of the present invention interfaces between a human operator and a human extender physical plant 3, which in turn manipulates physical object or payload 5. During the manipulation, the hand of the human operator interacts with the surrounding environment, say a handle as shown in FIG. 1(B), thus exerts force on the handle. This force is measured by a force sensitive device to produce contact force signals, $F_{hand}$. Similarly, the interaction between the physical plant 3 and the payload 5 generates interacting force signals, $F_{env}$. Moreover, because the physical plant is driven by at least one actuator, the interaction between the physical plant and the physical object during the manipulation causes a force exerting on the actuator, which can also be measured to generate actuating force signals, $F_{act}$. In use, the controller 1 receives the incoming force signals, $F_{hand}$, $F_{env}$ and $F_{act}$, and produces corresponding drive signals, $D_{act}$, to manipulate the payload 5 through the physical plant 3, as long as the payload 5 is within the capacity of the human extender controller.

The capability of a human extender controller is measured by its force reflection ratio. Assuming that payload 5 weighs 1000 lbs. ("$F_{env}$") and human extender controller 3 has a force reflection ratio 100, the human operator would "feel" 10 lbs. forces ("$F_{hand}$") while the extender physical plant 3 supports the rest of the load (990 lbs.). The 10 lbs. contact forces are used not only for manipulation of the payload 5, but also for generating the appropriate drive signals ("$D_{act}$") through controller 1 to human extender physical plant 3 to supply additional forces to perform the task the human operator is doing, namely, manipulating payload 5. Human extender physical plant 3, as demonstrated in the NGMH, can use hydraulic actuators to provide forces. Other forms of actuation, such as rotary and linear electric actuators, can also be easily adopted to generate forces needed to perform various tasks.

Figure 3:
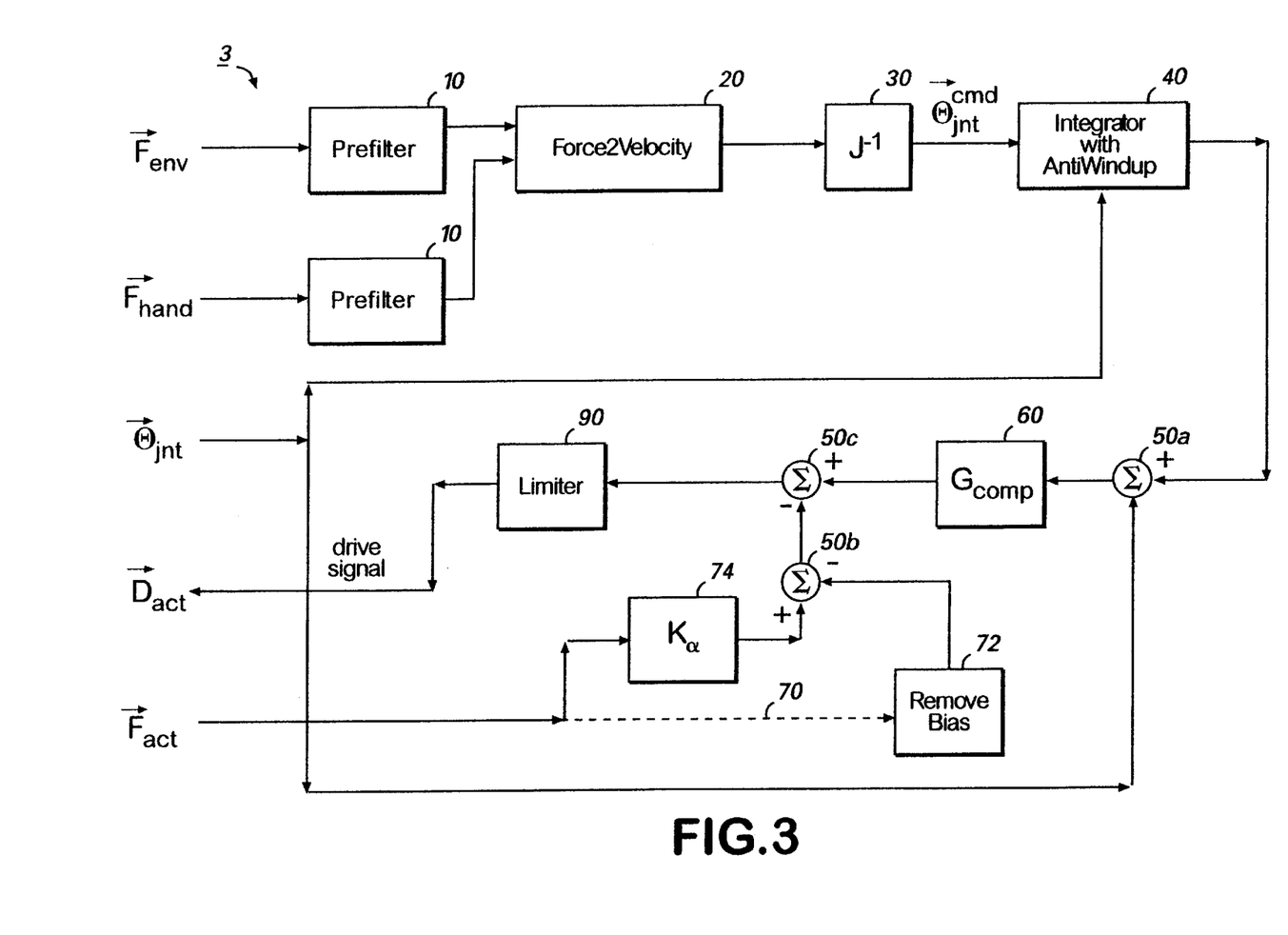
FIG. 3 displays a block diagram for a velocity based human extender controller according to a preferred embodiment of the present invention.
Figure 3B:
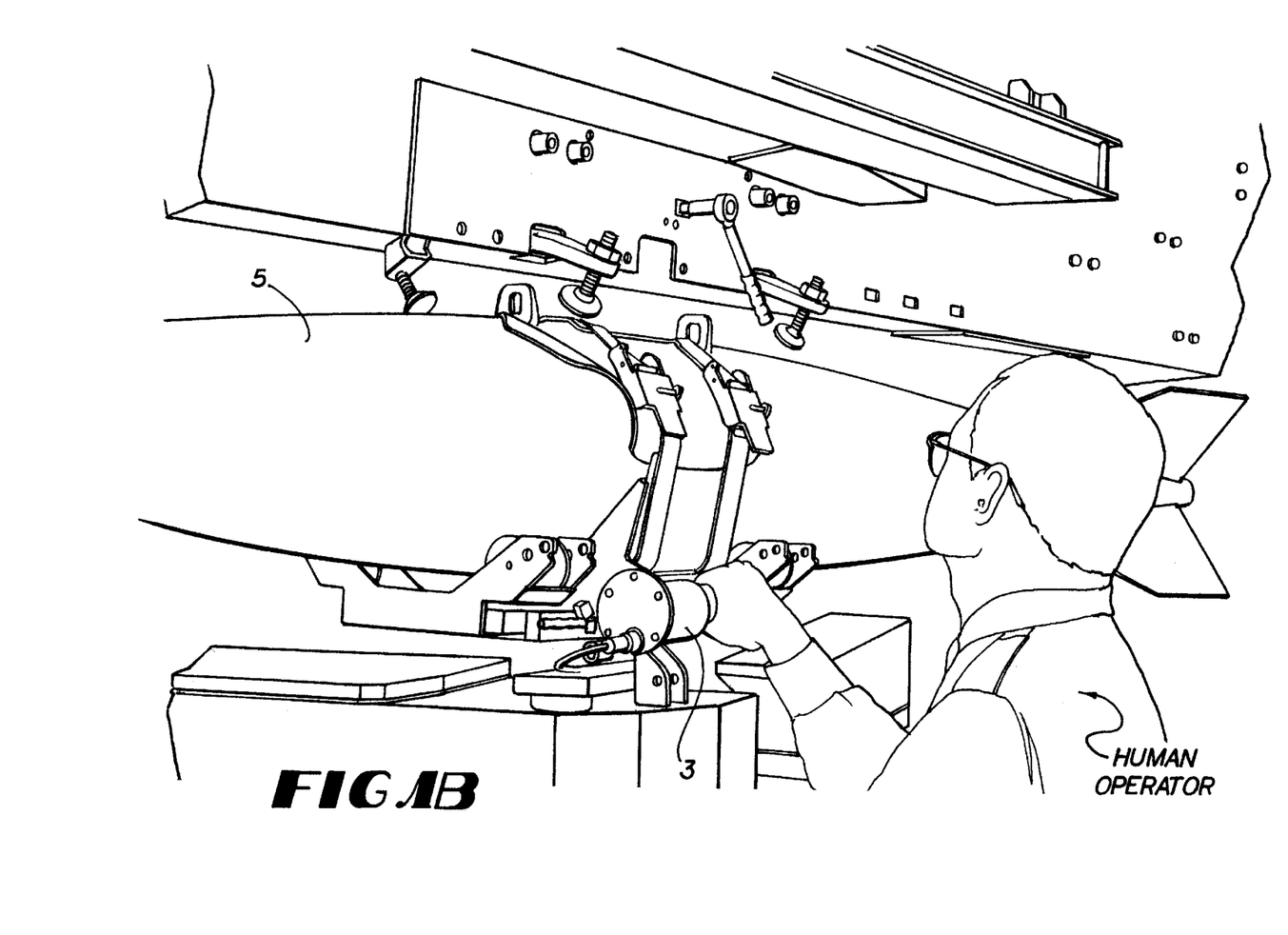

Human extender controller 1 according to the present invention can take several alternative designs. FIG. 3 shows a first embodiment of the human extender controller 1 according to the present invention. In FIG. 3, human extender controller 1 is a velocity-based human extender controller. Human extender controller 1 includes two pre-filters or filters 10 to receive the contact force signals from the interaction between the human operator and the environment and the interacting force signals between the physical plant and the payload, and to eliminate noise from the force signals respectively. Among many available choices of filters available, the present invention uses either a first or a second order lag filter. A combination of a first and a second lag filter can also be utilized. The force signals can be collected by force sensitive devices such as force/torque sensors or load cells. A preferred type of force sensitive devices is a strain gauge type transducer. Alternatively, a semi-conductor based gauge type transducer can also be used. The force signals collected by a force sensitive device include three components of force and three components of torque present. Force sensors can be mounted on a handle, as shown in FIG. 1(B), on the extender arm or on other structures to provide direct contact between a human operator and the human extender, to measure the contact force signals. Force sensors are also located at the physical plant to measure the interacting force signals reflecting the interaction between the physical plant and the payload. Moreover, force sensors are associated with the actuators to measure the actuating force signals.

Referring to FIG. 3, as shown in block 20, the filtered contact and interacting force signals from prefilter(s) 10 are then changed into an equivalent velocity signal according to the following rule:

$$v = A_{joy} F_{hand} - A_{ext} F_{env}$$

where $A_{joy}$ is a joystick accommodation matrix (typically 6×6), $A_{ext}$ is an external accommodation matrix (typically 6×6), and v is the Cartesian velocity vector (typically 6×1). Optionally, logical statements can be programmed into block 20 to establish a threshold force to ensure that the human extender controller 1 is activated only when $F_{env}$ passes the threshold. An index switch (not shown) may be utilized to trigger the operation of the logical statements. Although v now appears as a velocity vector, however, it contains the information embodied in the force signals $F_{env}$ and $F_{hand}$. Moreover, $A_{joy}$ and $A_{ext}$ can be programmed to achieve the desired force reflection ratio.

The Cartesian velocity v is converted into joint velocity at a conversion block 30. This conversion is typically performed by inverting a matrix called the manipulator Jacobian ("J"). The matrix elements of J are manipulator specific, as known by people skilled in the art. The inversion process involves inverting a square matrix that is nonsingular. However, if the manipulator has more degrees-of-freedom then required to perform a task (i.e., it is mechanically redundant) then the inversion process optimizes some performance criteria. For the NGMH, an optimization criteria that avoided joint limits is utilized.

The joint velocity signals are then integrated at integration block 40. Integration block 40 at least has an integrator with antiwindup capability or limits on upper bounds of the integrated signals. In other words, block 40 integrates the incoming joint velocity signals with the restriction that if a joint limit is reached it will limit the output to the joint limit value without allowing the integrator term to build up.

The integrated joint velocity signals, combined with the signals containing information about joint displacements ("$\theta_{jnt}$") are summed at block 50. Then, still referring to FIG. 3, compensation block 60 utilizes a compensator with a high gain feedback, $G_{comp}$, to compensate the incoming signals from block 50. Preferably, $G_{comp}$ is a proportional type or lag-lead type compensator. For a sufficient high amplification gain value, say $K_{comp}$, the affect of plant variation due to load, fluid temperature variation, fluid bulk modulus and other disturbances can be reduced and thus the likelihood of system instability is reduced. The value of $K_{comp}$ can be chosen as a constant or a value determined by solving a characteristic equation using the root locus sketch as known by people skilled in the filed and further discussed in a simplified single degree-of-freedom system vide infra.

Similarly, the incoming actuating force signals, $F_{act}$, are also sensitive to the variation of the environment including variation of the payload 5. An inner-feedback loop 70 is utilized here to increase the equivalent damping of the operating system to stabilize it when the physical plant 3 contacts with the environment. Without this inner-feedback loop, the position of the physical plant 3 may oscillate when contact with the environment is made. The inner-feedback loop 70 contains a zeroing block 72, a vector gain block 74 and a summation block 50b. Block 72 removes bias from the incoming actuating signals by, for example, zeroing the signals at startup. Block 74 feeds the actuating force signals once the bias values are removed therein. The block 74 is characterized by an actuator force or moment gain, $K\alpha$, which is chosen as a constant in this embodiment of the present invention. The inner-feedback loop 70 may also include a load cell, a clevis pin, an accelerometer, or other instrument for measurement of the incoming actuating force signals. Because the high gain feedback block 60 and the inner-feedback loop 70 respond directly to the variations of the environment, the controller 1 has a high tolerance for these variations and thus achieves stability over a wide range of variations of the environment. Moreover, because the utilization of high gain feedback block 60 and inner-feedback loop 70, the use of model-based approach such as computed-torque method is eliminated. The present invention hence requires less computing capacity without compromising the stability of the controller.

All incoming signals, now properly processed, are summed at summation block 50c and introduced into a limiter 90. Limiter 90 limits the upper and lower bounds of the incoming signals so that outgoing signals are confined within a range. These outgoing signals are driving signals, $D_{act}$, which are distributed by the limiter 90 to proper servo driver card(s) (not shown) connected to the actuator(s) (not shown). The actuator(s) then drive the physical plant 3 to manipulate the payload 5 accordingly.

Figure 4:
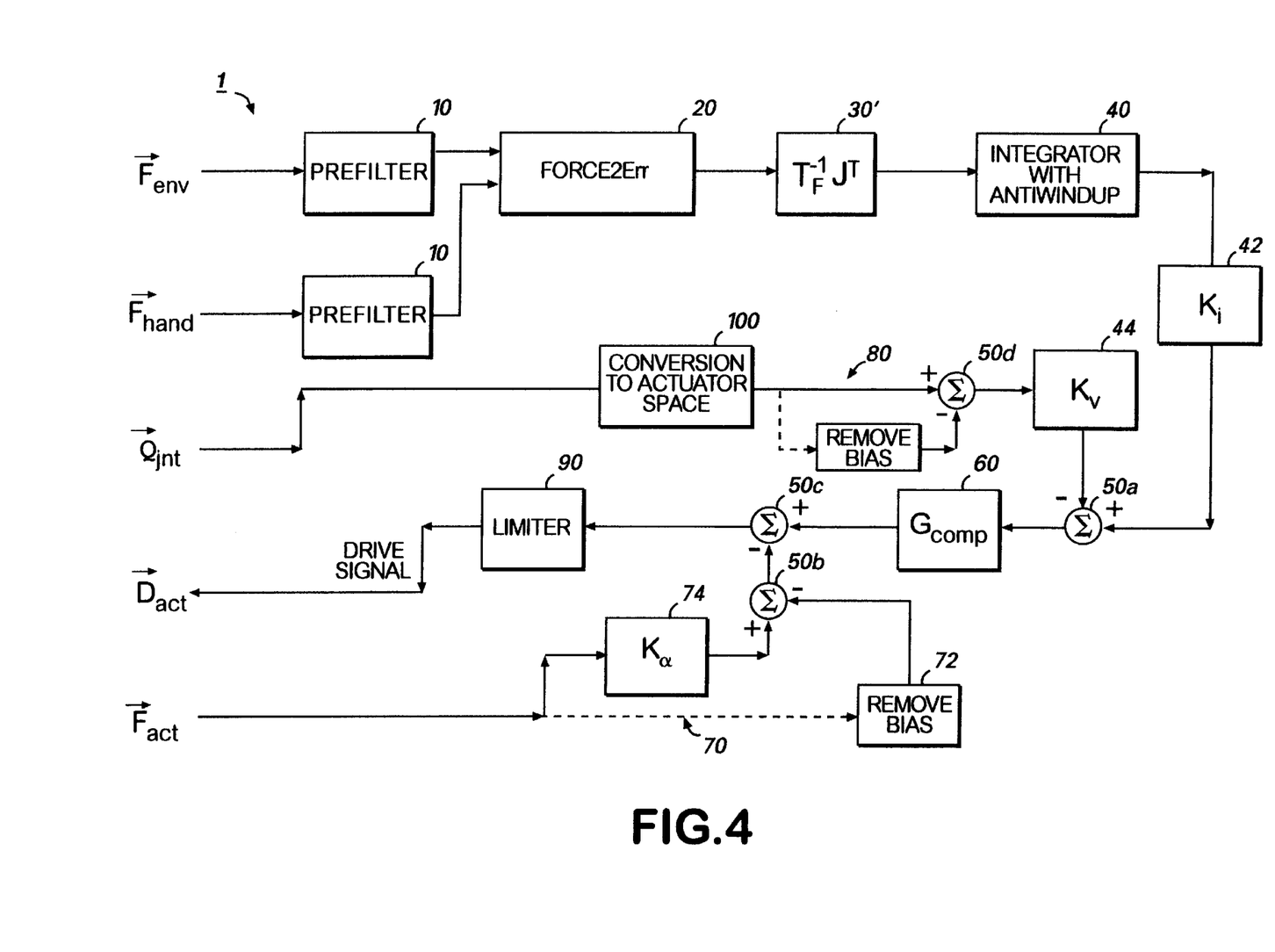
FIG. 4 displays a block diagram for an acceleration based human extender controller according to another preferred embodiment of the present invention.
Figure 4A:
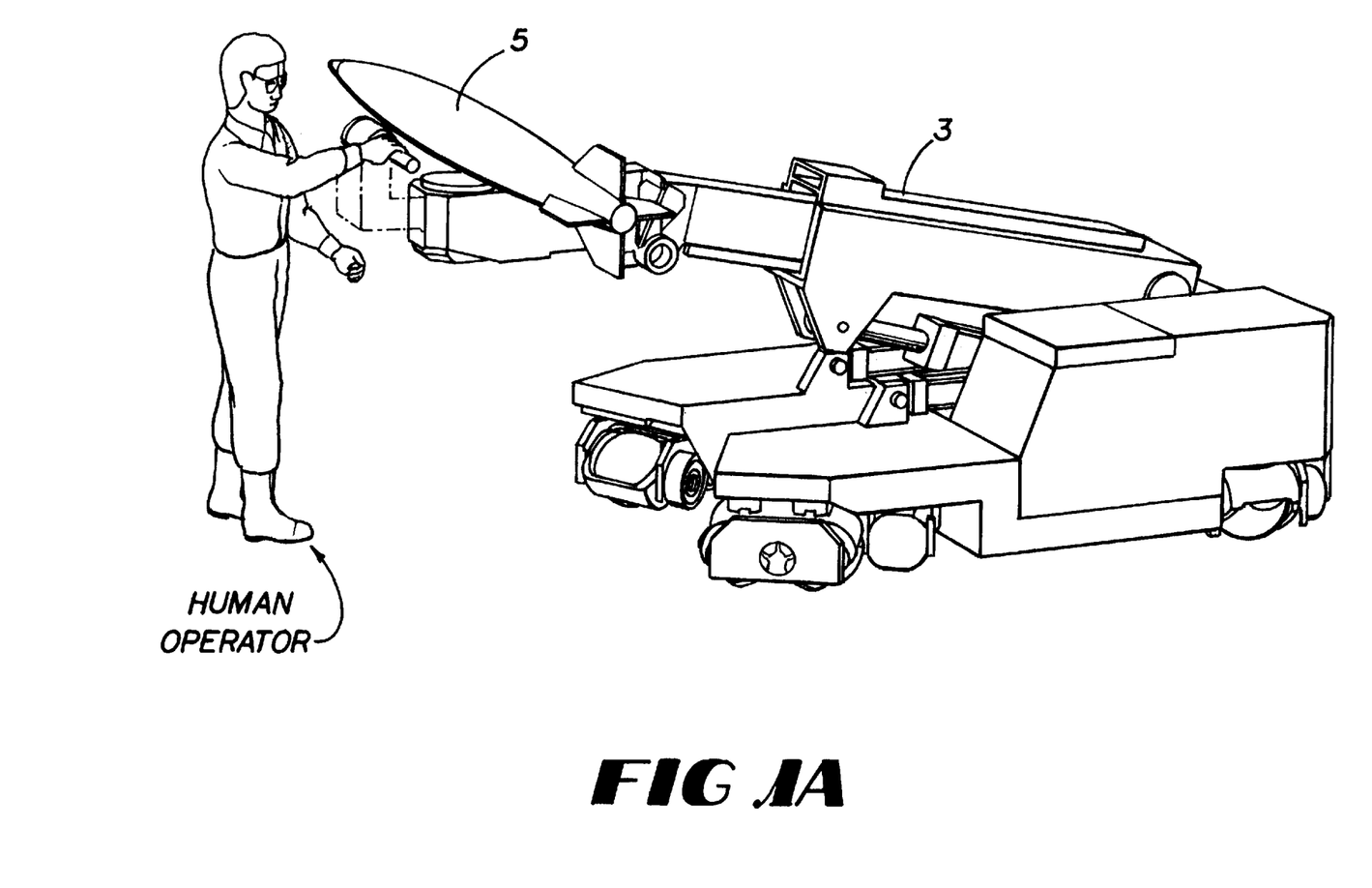

FIG. 4 shows another embodiment of the human extender controller 1 according to the present invention. In FIG. 4, human extender controller 1 is an acceleration or force-based human extender controller. Instead of converting the force signals into an equivalent velocity signal in the embodiment shown in FIG. 3, Force2Error block 20 receives the filtered contact and interacting force signals from prefilter(s) 10 and changes the force signals into an equivalent acceleration signal according to the following rule:

$$f = B_{joy} F_{hand} - B_{ext} F_{env}$$

where $B_{joy}$ is a joystick accommodation matrix (typically 6×6), $B_{ext}$ is an external accommodation matrix (typically 6×6), and f is the Cartesian force vector (typically 6×1). Again, logical statements may be programmed into block 20 to establish a threshold force to ensure that the human extender controller 1 is activated only when $F_{env}$ passes that threshold.

The Cartesian force f is subsequently converted into actuator forces at conversion block 30'. This conversion is typically performed by multiplying the transpose of the manipulator Jacobian ("J") with the inverse of the transmission ratio matrix ("$T_F$") that relates the joint moments to the actuator forces or actuator moments.

The converted signals are integrated at integration block 40 that has an integrator with antiwindup capability. After passing the integrator vector gain block 42, which is characterized by a force feedback gain $K_i$, the integrated force signals summed with $\theta_{jnt}$ at summation block 50a. The joint displacement signals $\theta_{jnt}$ has been converted into actuator space at conversion block 100 and the bias in $\theta_{jnt}$ has been removed through inner loop 80, which includes a summation block 50d.

Again, the incoming force signals are compensated at compensation block 60 by a compensator $G_{comp}$ with a high amplification gain $K_{comp}$, where $K_{comp}$ can be chosen as a constant or a value determined by solving a characteristic equation using the root locus sketch, as well as by an inner-feedback loop 70 to increase the equivalent damping of the operating system. As discussed above, the high gain compensator 60 and the inner-feedback loop 70 respond directly to the variations of the environment and therefore are able to stabilize the system over a wide range of variations of the environment.

Figure 5:
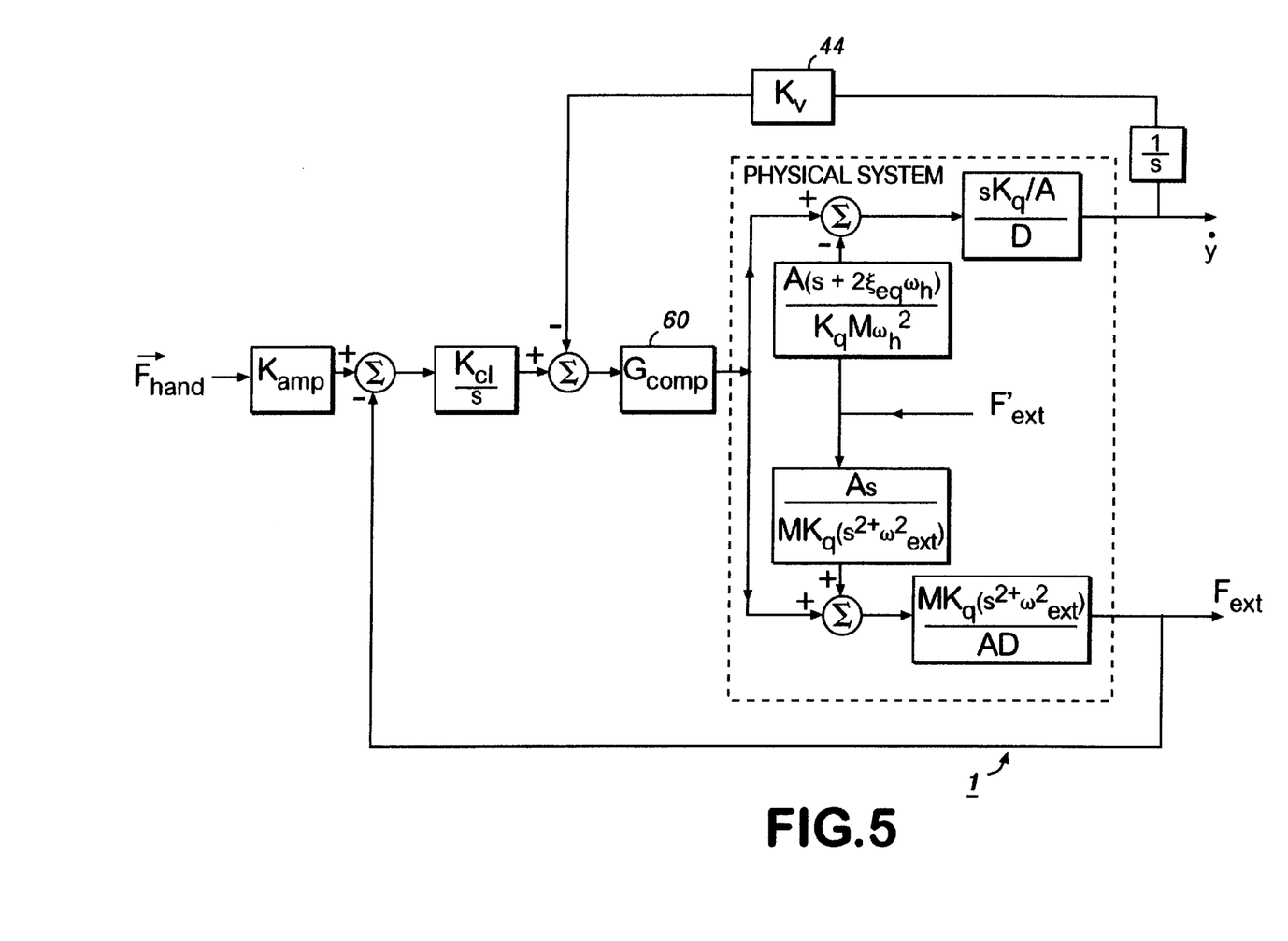
FIG. 5 displays a block diagram for a human extender controller according to a preferred embodiment of the present invention for a linearized one degree-of-freedom system.

The invention, especially the process to choose the value of gain $K_{comp}$ by solving a characteristic equation using the root locus sketch, will be better understood by reference to the following single degree-of-freedom embodiment, which is illustrated in FIG. 5.

A Single Degree-of-Freedom Embodiment

The physical plant is driven by actuators through mechanical joints. The movement of the joints causes the physical plant to interact with the payload. Typically, dynamic interactions between joints are relatively insignificant since each actuator drives each joint directly. Furthermore, slow to moderate manipulator speeds are typical when large payloads are manipulated. For these reasons, a single degree-of-freedom system is sufficiently accurate to represent the salient dynamics of the manipulator systems. FIG. 5 illustrates a block diagram of such a single degree-of-freedom system, where the electro-hydraulic system has been linearized with the assumption that hand forces interaction with the payload are insignificant.

Definition of Symbols for FIG. 5
A=effective cylinder area of a hydraulic container
$D=s(s^2/\omega_h^2+2s\xi_{eq}/\omega_h+1)+(\omega_{ext}/\omega_h)^2(s+2\xi_{eq}\omega_h)$ $F_{ext}$=external force measured by sensor
$F'_{ext}$=external force due to contact
$F_{hand}$=hand force
$G_{comp}$=proportional or lag-lead type compensator
$K_{amp}$=amplification gain of the human extender
$K_\alpha$=actuator force or moment feedback gain
$K_{cli}$=integrator gain
$K_q$=flow gain
$K_v$=position feedback gain (behaves like velocity damping)
M=mass of load
s=Laplace operator
y=actuator position
$\dot{y}$=actuator velocity
$\alpha_v=K_v/K_{cli}$
$\xi_h$=hydraulic damping ratio
$\xi_{eq}$=equivalent damping=$\xi_h+(M\,K_q\,K_\alpha\,\omega_h)/(2A)$
$\omega_h$=hydraulic natural frequency
$\omega_{ext}$=external natural frequency (assuming spring type load, will be zero if load is not a spring as the case discussed vide infra)

Discussion of the Embodiment Shown in FIG. 5

Two transfer functions can be obtained from FIG. 5. The first is the transfer function from the force at the hand, $F_{hand}$, to the actuator velocity, $\dot{y}$, with the external force due to the contact, $F'_{ext}$, set to zero $$\dot{y}T_{F^{hand}}=[K_{amp}K_{cli}G_{comp}(K_q/A)]/[s(s^2/\omega_h^2+2s\xi_{eq}/\omega_h+1)+MK_{cli}G_{comp}(K_q/A)(s+a_v)] \quad (1)$$

with the assumptions that the load will be a constant load and not a spring type load (i.e., $\omega_{ext}$=0). The second transfer function is the one that relates the external force due to contact, $F'_{ext}$, to actuator velocity, $\dot{y}$, with the force at the hand, $F_{hand}$, set to zero $$\dot{y}T_{F^{ext}}=(-1/M)[s(s^2/\omega_h^2+2s\xi_{eq}/\omega_h+1)+MK_{cli}G_{comp}(K_q/A)]/[s(s^2/\omega_h^2+2s\xi_{eq}/\omega_h+1)+MK_{cli}G_{comp}(K_q/A)(s+a_v)] \quad (2)$$

with the assumption that the load will be a constant load and not a spring type load (i.e., $\omega_{ext}$ =0).

Figure 6:
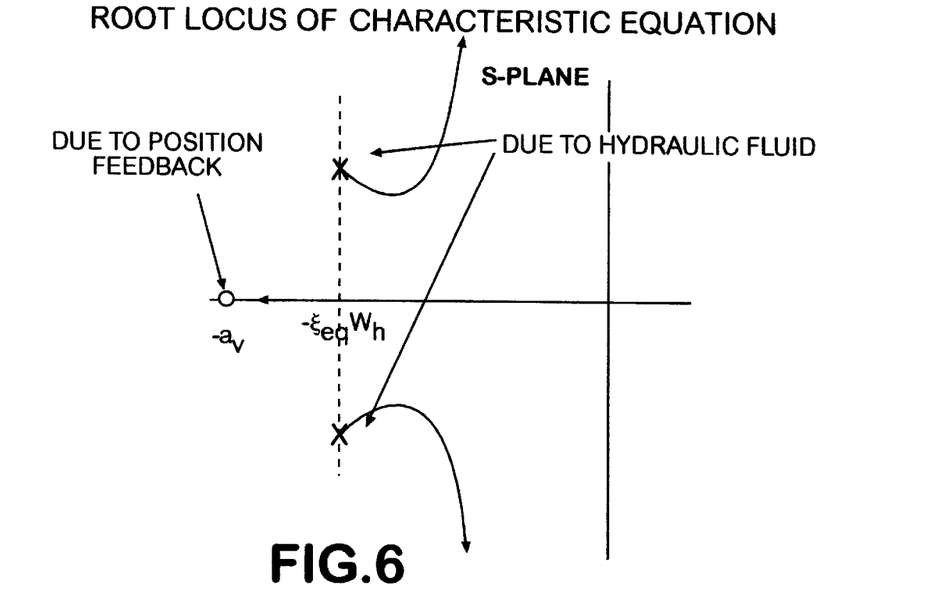
FIG. 6 schematically shows Root Locus of the characteristic equation for the system shown in FIG. 5.

If the compensator 60, $G_{comp}$, is set to a proportional gain denoted by $K_{comp}$, then the characteristic equation for both transfer functions is the same as follows $$s(s^2/\omega h^2+2s\xi_{eq}/\omega_h+1)+MK_{cli}K_{comp}(K_q/A)(s+a_v)=0 \quad (3)$$

which represents the equivalent root locus problem with $K_{comp}$ as the variable. The root locus of the characteristic equation (3) is plotted in FIG. 6. From this plot one can see how the roots of the characteristic equation are affected by the change in compensator gain $K_{comp}$. The placement of the two poles due to the hydraulic fluid can be shifted to the left by changing the equivalent damping, $\xi_{eq}$, by increasing the actuator force or moment gain, $K_\alpha$. The real part of the these two poles is ($-\xi_{eq}\,\omega_h$) The placement of the zero can be moved to the left by increasing the position feedback gain, Kv. The design objective for the first transfer function, $\dot{y}T_{F^{hand}}$, is that the time response due to a step input should have zero or very small amount of overshoot, which can be termed as nonovershooting step response. If this is not satisfied then the actuator acceleration response will go negative for a step change in the force at the hand, $F_{hand}$, and will be perceived by the human operator as acceleration forces at his or her hand that are opposing his or her intended motion.

Achieving a nonovershooting step response is an important feature of the present invention with respect to the single degree-of-freedom system. In order to do so, the pole originating at the origin must never pass the real part of the two poles caused by the hydraulic fluid. This constraint forces an upper limit on the allowable range of $K_{comp}$. Preferably, the value of $K_{comp}$ should be high. The importance of achieving high $K_{comp}$ gain value is to reduce the affect of plant variation (i.e., change in load, temperature variation, fluid bulk modulus, nonlinear dynamics due to the orifices in the servo valves, etc.). This gain can be increased by adjusting the location of the position feedback gain, Kv, and the actuator force or moment gain, $K_\alpha$. If the hydraulic natural frequency, $\omega_h$, is already high, feeding back the actuator force or moment might then not be necessary. The hydraulic natural frequency, $\omega_h$, can only be adjusted during the mechanical design of the actuator. If $K_{comp}$ still is too low, a classic lag-lead compensator with poles and zeros in between the pole and zeros on the real axis can be utilized and will be limited only by the noise of the sensors and the saturation limits of the drives.

The second transfer function, $^yT_{F^{ext}}$, relates the external contact forces during impact to the actuator velocity. Due to the sign convention of motion (i.e., a positive contact force will generate a negative actuator velocity), the design constraint on this transfer function is that the time response due to a step input of contact force should have zero overshoot or a nonovershooting step response of the actuator velocity. If this is not satisfied then the actuator acceleration will temporarily go positive and the payload will drive into the surface. A small amount of overshoot can be tolerated (base on the acceptability of the operator).

To come close to achieve this objective is basically the same as the previous case with the exception that the numerator of $^yT_{F^{ext}}$, has two zeros that are close to the two poles due to the presence of the hydraulic fluid in the characteristic equation (3) if $K_{comp}$ achieves a high enough value. If $K_{comp}$ is large enough, then the zeros in the numerator of $^yT_{F^{ext}}$, will be almost canceled by the two poles due to the hydraulic fluid in its denominator. In the limit as $K_{comp}$ goes to infinity, $$^yT_{F^{ext}} \rightarrow (-1/M)(s + a_v), \text{ when } K_{comp} \rightarrow \infty$$

which demonstrates an imperfect pole-zero cancellation. Therefore, in the limit with high gain feedback, the human extender will feel the mass of the payload, M, and the programmable viscous friction force.

Figure 7:
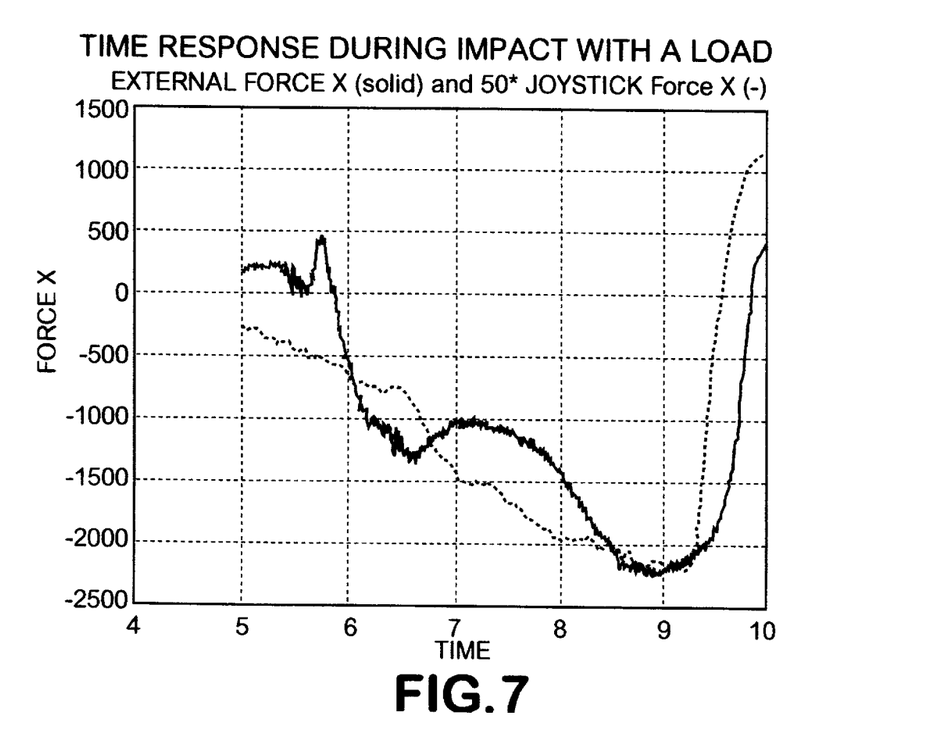
FIG. 7 displays time response during impact with a load (hand force is the dashed line and the external force is the solid line).

FIG. 7 displays time response during impact with a load. The commanded hand or joystick force and the external force in the vertical direction is shown. The force amplification is set at 50. FIG. 7 shows that external force tracks the hand force quite well. This demonstrates that this particular embodiment of the present invention is quite stable and works well, even though the solutions of the characteristic equation (3) obtained through the root locus sketch only approximate the exact solutions of the equation.

Although the present invention has been described with reference to specific details of certain embodiments thereof, it is not intended that such details should be regarded as limitations upon the scope of the invention except as and to the extent that they are included in the accompanying claims.

What is claimed is:

1. A controller for interfacing, a human operator and a physical object through a physical plant, wherein the physical plant is driven by at least one actuator, comprising:
   a. means for generating incoming signals, wherein the incoming signals comprise:
      i. contact force signals representative of forces from a hand of the human operator interacting with surrounding environment;
      ii. interacting force signals representative of forces caused at the physical plant by interaction between the physical plant and the physical object; and
      iii. actuating force signals representative of forces caused at the actuator by interaction between the physical plant and the physical object;
   b. means for compensating at least partially the incoming signals directly in response to variations of surrounding environment and providing a high feedback gain to reduce overshooting to a step response; and
   c. means for generating drive signals from the at least partially compensated incoming signals;
   wherein the actuator uses the drive signals to manipulate the physical object through the physical plant.

2. The controller of claim 1, wherein the incoming signal generating means comprises at least one force sensitive device.

3. The controller of claim 2, wherein the force sensitive device comprises a sensor selected from a group consisting of a strain gauge type transducer and a semi-conductor based gauge type transducer.

4. The controller of claim 1, wherein the incoming signal generating means further comprises means for receiving and filtering the contact force signals and interacting force signals.

5. The controller of claim 4, wherein the receiving and filtering means comprises at least one filter selected from a group consisting of a first order lag filter and a second order lag filter.

6. The controller of claim 1, wherein the incoming signal generating means further comprises means for converting the contact force signals and interacting force signals into an equivalent Cartesian velocity signal vector.

7. The controller of claim 1, wherein the incoming signal generating means further comprises means for converting a contact force signals and interacting force signals into an equivalent force signal vector.

8. The controller of claim 1, wherein the incoming signal generating means further comprises means for integrating the contact and interacting force signals.

9. The controller of claim 8, wherein the integrating means comprises an integrator with antiwindup capability.

10. The controller of claim 1, wherein the compensating means comprises an inner-feedback loop having a constant gain.

11. The controller of claim 10, wherein the inner-feedback loop comprises a load cell or a clevis pin.

12. The controller of claim 10, wherein the inner-feedback loop comprises an accelerometer.

13. The controller of claim 1, wherein the compensating means comprises a compensator.

14. The controller of claim 13, wherein the compensator is capable of producing a constant gain.

15. The controller of claim 13, wherein the compensator comprises a series of lag-lead compensators.

16. The controller of claim 1, wherein the drive signals generating means comprises a limiter.

17. The controller of claim 1, wherein the actuator comprises an actuator selected from a group consisting of a hydraulic actuator and an electric actuator.

18. A controller for interfacing a human operator and a physical object through a physical plant, wherein the physical plant is driven by actuating means, comprising:
   a. means for generating contact force signals representative of forces from a hand of the human operator interacting with surrounding environment;
   b. means for generating interacting force signals representative of forces caused at the physical plant by interaction between the physical plant and the physical object;
   c. means for generating actuating force signals representative of forces caused at the actuating means by interaction between the physical plant and the physical object;
   d. means for collecting and filtering the contact and interacting force signals;
   e. means for compensating the contact and interacting force signals and providing a high feedback gain to reduce overshooting to a step response;

f. means for compensating the actuating force signals; and g. means for summing the contact force signals, the interacting force signals and actuating force signals into drive signals;

wherein the actuating means uses the drive signals to manipulate the physical object through the physical plant.

19. The controller of claim 18, wherein the contact and interacting force signals compensating means comprises a compensator capable of providing a high feedback gain.

20. The controller of claim 18, wherein the actuating force signal compensating means comprises an inner-feedback loop.

21. The controller of claim 18, wherein the actuating means comprises an actuator.

22. A controller for interfacing a human operator and a physical object through a physical plant, wherein the physical plant is driven by at least one actuator, comprising:

a. at least one first force sensitive device for generating contact force signals representative of forces from a hand of the human operator interacting with surrounding environment;

b. at least one second force sensitive device for generating interacting force signals representative of forces caused at the physical plant by interaction between the physical plant and the physical object;

c. at least one third force sensitive device for generating actuating force signals representative of forces caused at the actuator by interaction between the physical plant and the physical object;

d. at least one first filter receiving the contact force signals from the first force sensitive device;

e. at least one second filter receiving the interacting force signals from the second force sensitive device;

f. a compensator for compensating the contact and interacting force signals, wherein the compensator is capable of producing high feedback gain to reduce overshooting to a step response;

g. an inner-feedback loop having a constant gain for compensating the actuating force signals, the inner-feedback loop comprising a load cell; and h. a limiter receiving the compensated contact force signals, interacting force signals and actuating force signals, and thereby generating drive signals for manipulating the physical object, whereby the actuator receives the drive signals and uses the drive signals to manipulate the physical object through the physical plant.

23. A method for interfacing a human operator and a physical object through a physical plant, wherein the physical plant is driven by at least one actuator, comprising the steps of:

a. generating contact force signals representative of forces from a hand of the human operator interacting with surrounding environment;

b. generating interacting force signals representative of forces caused at the physical plant by interaction between the physical plant and the physical object;

c. generating actuating force signals representative of forces caused at the actuator by interaction between the physical plant and the physical object;

d. receiving and filtering the contact force signals and interacting force signals;

e. compensating the actuating force signals by damping, the actuating force signals;

f. generating drive signals from the contact force signals, interacting force signals and actuating force signals; and g. using the drive signals to manipulate the physical object through the physical plant.

24. The method of claim 23, further comprising the steps of:

a. changing the contact force signals and the interacting force signals into equivalent Cartesian velocity signals;

b. converting the Cartesian velocity signals into joint velocity signals by inverting a manipulator-specific Jacobian matrix; and c. compensating the joint velocity signals with high feedback gain.

25. The method of claim 24, wherein the compensating step comprises the step of solving a characteristic equation of transfer function to determine the gain to reduce overshooting to a step response.

26. The method of claim 23, wherein the actuating force signals compensating step comprises the step of damping the actuating force signals by an inner-feedback loop.

27. A method for interfacing a human operator and a physical object through a physical plant, wherein the physical plant is driven by at least one actuator, comprising:

a. generating incoming signals, wherein the incoming signals comprise:
      i. contact force signals representative of forces from a hand of the human operator interacting with surrounding environment;
      ii. interacting force signals representative of forces caused at the physical plant by interaction between the physical plant and the physical object; and
      iii. actuating force signals representative of forces caused at the actuator by interaction between the physical plant and the physical object;

b. compensating at least partially the incoming signals directly in response to variations of the environment and providing a high feedback gain to reduce overshooting to a step response;

c. generating drive signals from the at least partially compensated incoming signals; and d. using, the drive signals to manipulate the physical object.

* * * * *